United States Patent
Ohran (10) Patent No.: US 7,434,093 B2
(45) Date of Patent: *Oct. 7, 2008

(54) DUAL CHANNEL RESTORATION OF DATA BETWEEN PRIMARY AND BACKUP SERVERS

(75) Inventor: Richard S. Ohran, Henderson, NV (US)

(73) Assignee: EMC Corporation, Hopkinton, MA (US)

( * ) Notice: Subject to any disclaimer, the term of this patent is extended or adjusted under 35 U.S.C. 154(b) by 86 days.

This patent is subject to a terminal disclaimer.

(21) Appl. No.: 11/129,858

(22) Filed: May 16, 2005

(65) Prior Publication Data

US 2005/0216790 A1    Sep. 29, 2005

(51) Int. Cl.
*G06F 11/00* (2006.01)
(52) U.S. Cl. .......................................... 714/6
(58) Field of Classification Search ...................... 714/5, 714/6, 15, 20
See application file for complete search history.

(56) References Cited

U.S. PATENT DOCUMENTS

| | | | |
|---|---|---|---|
| 4,467,421 A | | 8/1984 | White |
| 5,038,278 A | | 8/1991 | Steely, Jr. et al. |
| 5,086,502 A | | 2/1992 | Malcolm |
| 5,089,958 A | | 2/1992 | Horton et al. |
| 5,101,492 A | * | 3/1992 | Schultz et al. .................. 714/7 |
| 5,157,663 A | | 10/1992 | Major et al. |
| 5,163,148 A | | 11/1992 | Walls |
| 5,241,668 A | | 8/1993 | Eastridge et al. |
| 5,241,669 A | | 8/1993 | Cohn et al. |
| 5,241,670 A | | 8/1993 | Eastridge et al. |
| 5,263,154 A | | 11/1993 | Eastridge et al. |
| 5,278,838 A | * | 1/1994 | Ng et al. ......................... 714/6 |
| 5,349,655 A | | 9/1994 | Mann |

(Continued)

FOREIGN PATENT DOCUMENTS

EP    01991261.7 - 2224    5/2008

(Continued)

OTHER PUBLICATIONS

IBM Corp., IBM Technical Disclosure Bulletin, *Storage Management Mechanism for Managing Snapshot Pages*, pp. 26-29, Sep. 1992, author unknonwn.

(Continued)

*Primary Examiner*—Gabriel L Chu
(74) *Attorney, Agent, or Firm*—Workman Nydegger (57) ABSTRACT

Data blocks lost at a primary mass storage are restored while allowing the primary computer system to access the lost data block before full restoration. Restoration occurs along two channels. In the first channel, read requests issued by the primary computer system are handled by obtaining the requested data block from the backup mass storage device. The retrieved data block is then written to the primary mass storage, thereby restoring the primary mass storage for that data block. In the second channel of restoration, a snapshot copy of a selected data set of the backup mass storage is made and transported to the primary system. If the corresponding data block in the primary mass storage has a current data block, the data block is not written from the snapshot copy to the primary mass storage. Otherwise, the data block is copied from the snapshot copy to the primary mass storage.

14 Claims, 4 Drawing Sheets

U.S. PATENT DOCUMENTS

| | | | |
|---|---|---|---|
| 5,357,509 A * | 10/1994 | Ohizumi | 714/7 |
| 5,375,232 A | 12/1994 | Legvold et al. | |
| 5,379,398 A | 1/1995 | Cohn et al. | |
| 5,379,412 A | 1/1995 | Eastridge et al. | |
| 5,390,187 A * | 2/1995 | Stallmo | 714/7 |
| 5,403,639 A | 4/1995 | Belsan et al. | |
| 5,410,667 A | 4/1995 | Belsan et al. | |
| 5,414,850 A | 5/1995 | Whiting | |
| 5,426,747 A | 6/1995 | Weinreb et al. | |
| 5,435,004 A | 7/1995 | Cox et al. | |
| 5,448,718 A | 9/1995 | Cohn et al. | |
| 5,455,932 A | 10/1995 | Major et al. | |
| 5,515,502 A | 5/1996 | Wood | |
| 5,535,381 A * | 7/1996 | Kopper | 710/52 |
| 5,546,534 A | 8/1996 | Malcolm | |
| 5,649,152 A | 7/1997 | Ohran et al. | |
| 5,649,196 A | 7/1997 | Woodhill et al. | |
| 5,664,186 A | 9/1997 | Bennett et al. | |
| 5,719,889 A | 2/1998 | Iadanza | |
| 5,819,020 A | 10/1998 | Beeler, Jr. | |
| 5,835,953 A | 11/1998 | Ohran | |
| 5,889,935 A * | 3/1999 | Ofek et al. | 714/6 |
| 5,961,652 A * | 10/1999 | Thompson | 714/6 |
| 5,978,565 A | 11/1999 | Ohran et al. | |
| 6,029,231 A | 2/2000 | Blumenau | |
| 6,061,770 A | 5/2000 | Franklin | |
| 6,073,222 A | 6/2000 | Ohran | |
| 6,085,298 A | 7/2000 | Ohran | |
| 6,088,815 A * | 7/2000 | West et al. | 714/15 |
| 6,182,198 B1 | 1/2001 | Hubis et al. | |
| 6,226,651 B1 | 5/2001 | Masuda et al. | |
| 6,269,431 B1 * | 7/2001 | Dunham | 711/162 |
| 6,338,126 B1 | 1/2002 | Ohran et al. | |
| 6,389,459 B1 * | 5/2002 | McDowell | 709/216 |
| 6,499,091 B1 * | 12/2002 | Bergsten | 711/162 |
| 6,526,418 B1 * | 2/2003 | Midgley et al. | 707/204 |
| 6,549,921 B1 * | 4/2003 | Ofek | 707/204 |
| 6,694,447 B1 * | 2/2004 | Leach et al. | 714/6 |

FOREIGN PATENT DOCUMENTS

| | | |
|---|---|---|
| JP | 03-241441 | 10/1991 |
| JP | 07-262068 | 10/1995 |
| JP | 09-305467 | 11/1997 |
| WO | WO 97/24668 | 7/1997 |

OTHER PUBLICATIONS

Veritas Software Corp., *Veritas File System (VxFS) System Administrator's Guide*, circa Feb. 1992, author unknown.

Sale of Veritas File System (VxFS) Software, circa 1992, sold by Veritas Software Corporation.

* cited by examiner

DUAL CHANNEL RESTORATION OF DATA BETWEEN PRIMARY AND BACKUP SERVERS

CROSS-REFERENCE TO RELATED APPLICATIONS

This application claims the benefit of and priority to U.S. patent application Ser. No. 09/997,656, filed Nov. 29, 2001, entitled "Dual Channel Restoration of Data Between Primary and Backup Servers," which application in turn claims the benefit of and priority to U.S. Provisional Patent Application Ser. No. 60/257,698, filed Dec. 21, 2000, which applications are incorporated herein by reference in their entireties.

BACKGROUND OF THE INVENTION

1. The Field of the Invention

The present invention relates to the restoration of computer data, and more particularly to a system and method for restoring data on a primary mass storage system through the use of a secondary mass storage system, while optimizing user access to the data from the time that the data is lost until it is restored to the primary mass storage system.

2. Background and Related Art

Businesses worldwide recognize the commercial value of data stored on their computer systems and are continually seeking reliable, cost effective ways to protect their valuable data. One common technique for protecting data is to make a backup copy of the data on a remote server so that the data can be retrieved if, for any reason, the original copy of the data is damaged or destroyed, such as for example, by a fire, flood, earthquake, explosion, or any other disaster. The effectiveness of this technique, however, depends, at least in part, on separating the remote server a significant distance away from the primary server, so that the event(s) causing damage to the original data will not also damage the backup data.

One consequence of separating the remote server from the primary server is that the available and affordable communication data rate between the two servers is significantly less than it would be if the servers were in close proximity. Accordingly, the loss of valuable data from a computer system may require an exorbitant amount of resources and time to be expended in order to restore the lost data to the computer system.

The costs associated with restoring data, which arises from not being able to use the computer system while data is being restored, are becoming greater as companies increasingly rely on computers and computerized data. Some companies have become so dependent on computerized data that the technique of shutting down the computer system for updates or data restoration is prohibitively expensive. This is particularly true when updating the data requires the computer system to be shut down while a backup tape is transported to the local site and until a mirrored copy of the data concurrently exists at the local and remote site.

Even when data is transmitted through high bandwidth communication lines, slow data rates resulting from the distances between the local and remote sites can extend the remirroring times between servers from hours to days or longer because of today's large data storage sizes. Further complicating the issue, during a remirror, data is copied on a physical block basis rather than a logical file basis. Accordingly, if the remirror is not 100% completed, the data is virtually worthless. Hence, during the remirror period, only a single copy of the data exists, during which time the data is vulnerable to becoming permanently lost or damaged.

BRIEF SUMMARY OF THE INVENTION

The above mentioned problems of the prior state of the art have been successfully overcome by the present invention, which is directed to methods and systems for restoring lost data blocks to a primary computer system while still allowing the primary computer system to continue operation even before restoration has occurred, and while restoring the primary mass storage to mirror the backup mass storage at least so far as a selected data set is concerned.7

In the present invention, there exists a computer system where data blocks are stored on a primary mass storage device at a primary location and a backup copy of the data blocks is stored on a backup mass storage device at a secondary location. The primary mass storage device is connected to a primary computer. The backup mass storage device is connected to a backup system.

The restoration occurs along two channels. In the first channel, data block are restored as they are used by the primary computer system. For example, as the primary computer system undergoes normal operation, the primary computer system occasionally generates read requests for a given data block. However, the corresponding data block of the primary mass storage is lost. Instead, the requested data block is retrieved from a backup mass storage. The retrieved data block is written to the primary mass storage and is processed by the application in the primary computer system. In addition, as the primary computer system undergoes normal operation, the primary computer system occasionally generates write requests for a given data block. The data block is written to both the primary and mass storage device.

Note that the primary computer system continues to write current data blocks to the primary mass storage even though there are still lost data blocks in the primary mass storage. This writing may be seen as one channel of restoration. As each current data block is written into the primary mass storage. A corresponding entry in an overwrite map is set to indicate which data blocks in the primary mass storage are current.

In the second channel of restoration, a snapshot copy is taken of a selected data set in the backup mass storage. This selected data set may correspond to the data blocks that are desired to be restored and may include the entire backup mass storage or just a portion thereof. The snapshot copy is then transported electronically or physically back to the primary computer system. For each data block in the snapshot copy, if the corresponding data block in the primary mass storage is not marked as current in the overwrite map, then the data block is copied from the snapshot storage to the primary mass storage. On the other hand, if the corresponding data block in the primary mass storage is not marked as being current in the overwrite map, then the data block is not copied from the snapshot storage to the primary mass storage so as to prevent older data blocks from replacing newer data blocks.

This mechanism maintains mirroring between the primary mass storage and the backup mass storage at least so far as the selected data set is concerned. In addition, the first restoration channel allows the primary computer system to continue to read and write data blocks and thus to continue operation.

Additional advantages of the present invention will be set forth in the description which follows, and in part will be obvious from the description, or it may be learned by practice of the invention. The advantages of the invention may be realized and obtained by means of the instruments and combinations particularly pointed out in the accompanying claims. These and other features of the present invention will become more fully apparent from the following description and accompanying claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EXEMPLARY EMBODIMENTS

The present invention contemplates both methods and systems for restoring data blocks to a primary mass storage device while allowing user access to the data blocks being restored. As such, this invention allows for computer operations to continue even though data blocks are lost from the primary mass storage system. The optimization is accomplished by using two channels of restoration.

In the first channel, in the normal course of operations, the primary computer system generates read requests for data blocks in the primary mass storage device. Instead of the primary mass storage device returning the requested data block, the backup mass storage device returns the requested data block over a transport link such as a dial-up connection. The data block is returned to the primary system for processing by the primary system and is also written into the primary mass storage device. Thus, the requested data block has been restored to the primary mass storage device. If, in the normal course of operations, the primary system generates a write request for a data block, the data block is written into the primary mass storage device and in the backup mass storage device. During this restoration period, whenever the primary system writes a data block into the primary mass storage device, the primary system also sets an entry in an overwrite map to indicate that the data block is current.

In the second channel of restoration, the backup computer system takes a static snapshot of the backup mass storage device corresponding to a selected data set that is to be restored. The snapshot is saved onto a physical storage medium and then transported back to the primary system. The static snapshot is then written back into the primary mass storage device through the overwrite map. If the overwrite map indicates that a data block in the primary mass storage device is current, then the corresponding data block is not copied from the static snapshot to the primary mass storage device. Otherwise, the data block is copied from the static snapshot to the primary mass storage device thereby restoring the primary mass storage device to mirror with the backup mass storage device at least as far as the selected data set is concerned.

The invention is described by using diagrams to illustrate either the structure or the processing of certain embodiments to implement the systems and methods of the present invention. Using the diagrams in this manner to present the invention should not be construed as limiting of its scope. The present invention can be practiced with general purpose or special purpose computers. All such computer systems should be included within the scope of the invention.

Embodiments within the scope of the present invention also include computer-readable media having encoded therein computer-executable instructions or data structures. Such computer-readable media can be any available media which can be accessed by a general purpose or special purpose computer. By way of example, and not limitation, such computer-readable media can comprise physical storage mediums such as RAM, ROM, EEPROM, CD-ROM, or other optical disk storage, magnetic disk storage, magneto-optical storage devices or magnetic storage devices, or any other medium which can be used to store computer-executable instructions and data structures and which can be accessed by a general purpose or special purpose computer. When a computer system reads from a communications link (whether wireless, wired, or a combination of wired and wireless), the communications link is also properly viewed as being a computer-readable medium. Combinations of the above should also be included within the scope of computer-readable media. In turn, registers of a CPU or other processing unit that store computer-executable instructions or data structures while decoding and executing the same are also included within the scope of the computer-readable media. Computer-executable instructions comprise, for example, executable instructions and data which cause a general purpose computer or special purpose computer to perform a certain function or a group of functions.

The term "data block" is used to describe a block of data that is written to or read from a mass storage means. The term "data block" is intended to be broadly construed and should include any size or format of data. For example, the data stored in an individual sector on a disk is properly referred to as a data block. The amount of data stored in a group or cluster of sectors may also be properly referred to as a data block. If the mass storage means is a RAM or other word or byte addressable storage device, the term data block may be applied to a byte, a word, or multiple word unit of data.

Figure 1:
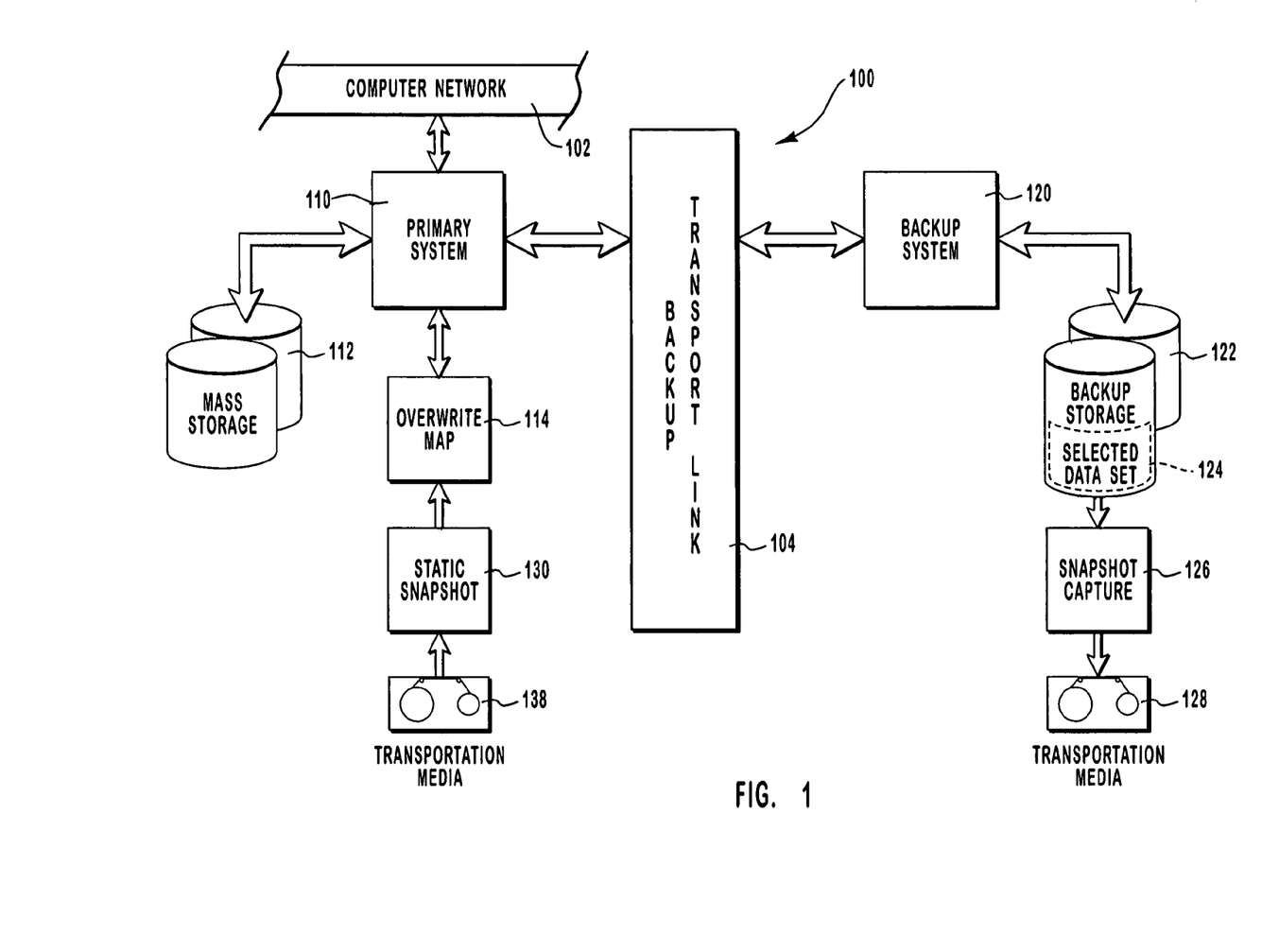
FIG. 1 is a block diagram of a representative configuration in which the method and system of the invention may operate.

Referring now to FIG. 1, a system level block diagram of one embodiment of the present invention is illustrated. The system, shown generally as 100, includes a primary system 110, a backup system 120, and a backup transport means such as a backup transport link 104 shown in FIG. 1 for transporting data between primary system 110 and backup system 120. The system could alternatively comprise more than one primary system and/or more than one backup system.

Where it is desirable to prevent the loss of data due to natural disasters or various types of intentional terrorism, primary computer system 110 and backup computer system 120 may be placed at geographically separated locations. Alternatively, it may be desirable to place primary computer system 110 and backup computer system 120 within close proximity to each other. While this invention is useful for either type of network configuration, it is particularly useful in many instances where the primary computer system 110 and the backup computer system 120 are separated geographically to the extent that restoring lost data in a conventional way by simply transmitting the data from the backup computer system to the primary computer system would take a prohibitively long period of time.

Primary system 110 may be any type of networked or stand alone computer system. For example, primary system 110 may be a network server computer connected to a computer network such as computer network 102. Primary system 110 may also be a stand alone system. Primary system 110 may also be a backup or standby server of a computer network connected to a primary server. The present invention can be used with any type of computer system. In this sense, the term "primary" is not meant to define or describe a computer system as a primary network server (as opposed to a backup or standby network server). Instead, the term "primary" is used in this description and in the claims to refer to the fact that the system has attached mass storage means for storing a copy of the data that is to be backed up. In other words, the term "primary" is used to differentiate primary system 110 from backup system 120.

Primary system 110 has attached thereto a mass storage means, depicted as mass storage 112, for storing a plurality of data blocks in a plurality of storage locations. The storage locations are addressed by a unique address or index so that a particular data block may be written thereto or retrieved therefrom. Mass storage 112 can be any storage mechanism that stores data that is to be backed up. By way of example, such mass storage means may comprise one or more magnetic or magneto-optical disk drives. Therefore, the mass storage means of the invention should not be viewed as limited to magnetic disk drives, but also can be implemented using optical discs, magnetic tape drives, or any other medium capable of handling the read and write requests of the particular computer system.

As described in greater detail below, embodiments within the scope of this invention may comprise an overwrite mapping means for tracking which locations of the primary mass storage device 112 has new data blocks written to the primary mass storage device since an instant in time. In FIG. 1, this overwrite mapping means is illustrates as overwrite map 114. In the preferred embodiment, the instant in time that triggers the overwrite map 114 keeping track of the location of new data blocks occurs at least after the data blocks are lost in the primary mass storage device, and at the latest at the time the snapshot is taken in the backup mass storage device. Thus, after the static snapshot is copied to the primary mass storage device after being filtered through the overwrite map, the primary mass storage device is brought back into synchronization with the backup mass storage device, at least so far as the selected data blocks in the static snapshot are concerned.

Since primary system 110 may be any type of general purpose or special purpose computer, primary system 110 may also comprise any other hardware that makes up a general purpose or special purpose computer. For example, primary system 110 may also comprise processor means for executing programmable code means. The processor means may be a microprocessor or other CPU device. The processor means may also comprise various special purpose processors such as digital signal processors and the like. Primary system 110 may also comprise other traditional computer components such as display means for displaying output to a user, input means for inputting data to primary system 110, output means for outputting hard copy printouts, memory means such as RAM, ROM, EEPROM, and the like.

Backup system 120 of FIG. 1 comprises backup storage means, depicted as backup storage 122, for storing data blocks received from primary system 110. Backup storage means can comprise any type of storage device capable of storing data blocks received from a primary system.

In order to transfer data between primary system 110 and backup system 120, backup transport means is used. Backup transport link 104 is one example of backup transport means for transporting data between primary system 110 and backup system 120. Backup transport link 104 may comprise any combination of hardware and/or software needed to allow data communications between primary system 110 and backup system 120. For example, backup transport link 104 may be a local area network (LAN), a wide area network (WAN), a dial-up connection using standard telephone lines or high speed communication lines, the Internet, or any other mechanism that allows data to flow between primary system 110 and backup system 120.

A backup copy of the data blocks on primary mass storage 112 is created on backup storage 122. The creation of the backup copy can take place through a variety of methods. One method would involve copying all of the data blocks from a primary mass storage device to a backup mass storage device at a specified period in time. The frequency to which the copying must occur depends upon the type of data that is being backed up and the frequency to which the data becomes stale. If, for example, the data becomes stale very quickly, the period must occur frequently.

Another method involves a process whereby a time sequence of data is captured and saved. Many systems incorporate disk mirroring or duplexing, where the changes that are made to a primary mass storage system are sent to a backup or secondary mass storage system. In other words, when a data block is written to the primary mass storage system, the same data block is written to a backup mass storage system. By copying each write operation to a second mass storage system, two mass storage systems may be kept mirrored so that they are virtually identical at the same instant in time.

Referring to FIG. 1, a write command is simultaneously sent to mass storage 112 and backup storage 122. If one mass storage device fails, the data is still available on the other mass storage device. Mass storage 112 and backup storage 122 are each connected to a mass storage controller. Therefore, if one of the mass storage controllers or one of the storage means fails, then the data is still accessible through the other mass storage controller and storage means. Such a concept can be extended to include entire systems where a secondary network server backs up a primary server so that if a failure occurs in the primary network server, the secondary network server can take over and continue operation, as shall be explained below.

The remainder of FIG. 1 schematically illustrates a flow for restoring data blocks lost at the primary mass storage 112 and will be explained by referring FIG. 2. The method invention starts at decision block 202, which determines whether data blocks have been lost on primary mass storage device 112. This determination may be made by the primary computer system, the backup computer system, and/or by some other mechanism.

After decision block 202 determines that data blocks on primary mass storage 112 have been lost, data is restored using two restoration channels. One restoration channel begins with step 204 in which the primary computer system writes current data blocks to the primary mass storage device. The primary computer system may access current data blocks in a number of ways.

For example, in the normal course of computer operations, application programs or the operating system of the primary computer system may generate a read request for a data block that corresponds to a lost data block in the primary mass storage. Instead of the primary mass storage returning the request data block, the read request is routed over the transport link 104 to the backup computer system resulting in the requested data block being retrieved from the backup mass storage 122. The retrieved data block is then written to the primary mass storage. One method that can be employed for reading from the backup mass memory device 122 is described in U.S. patent application Ser. No. 6,560,617, Issued May 6, 2003, and entitled "Operation of Standby Server to Preserve Data Stored by a Network Server," which is incorporated herein by reference.

Also, in the normal course of computer operations, application programs or the operating system of the primary computer system may generate a write request for a data block that is to overwrite a lost data block in the primary mass storage. The new data block is then written to both the primary mass storage and is transported over the transport link 104 for writing to the backup mass storage.

In both of these circumstances, the primary computer system operates normally. The main difference is that the primary computer system reads data blocks from the backup mass storage device rather than from the primary mass storage device. From the perspective of the user of the primary computer system, the primary computer system is behaving properly. The only performance difference might be some latency involved with accessing the data block over the transport link rather than locally. Still, the primary computer system continues to operate even though data has been lost from its primary mass storage.

To assist in the second channel of restoration (steps 208 and 210), the primary computer system marks the location of any current data blocks that are in the primary mass storage in the overwrite map 114 (step 206). Thus, the location of any new data blocks written to the primary mass storage device after the data blocks are lost are marked in the overwrite map, regardless of whether the new data blocks are read from the backup mass storage device or generated as write requests by the primary computer system.

While this first channel of restoration allows the primary computer system to continue accessing lost data blocks, the access time may be slow. Thus, at some point the data blocks should be restored locally to the primary mass storage so that the primary computer system may more quickly access the data blocks. The second channel of restoration is designed to accomplish this.

In the second restoration channel, step 208 creates a snapshot copy of a selected data set 124 of the backup storage 122 using a snapshot capture 126 mechanism. The selected data set may include the entire backup mass storage or may just include a portion thereof. A method of taking a snapshot is more particularly described in U.S. Pat. No. 5,649,152, entitled "Method and System for Providing a Static Snapshot of Data Stored on a Mass Storage System," which is incorporated herein by reference. The snapshot copy provides a copy of all data blocks on backup storage 122 at an instant in time when the data blocks are in a logically consistent state. The snapshot copy is then transported in step 210 to the location of the primary mass storage 112. The transporting of the snapshot copy can take place in a variety of manners. The snapshot copy, having been preserved on any type of writeable storage device, can be transported electronically or physically. One embodiment allows moving the physical transportation media 128 that contains the snapshot copy from the location of backup system 120 to the location of primary system 110. The two locations, as mentioned above, could be within close proximity or geographically separated from each other.

Once the static snapshot copy 130 is moved to the physical location of the primary mass storage. The static snapshot copy 130 is copied data block by data block back into the primary mass storage by referring to the overwrite map. Specifically, decision block 212 refers to the overwrite map 114 to determine whether each data block is already current in the primary mass storage. If it is current ("YES" in decision block 212), then the data block is not copied from the static snapshot copy 130 into the primary mass storage 112. Instead, the decision block just evaluates the next data block. On the other hand, if the data block is not current in the primary mass storage ("NO" in decision block 212), then the data block is copied from the static snapshot copy 130 into the primary mass storage (step 214) and the next data block is then evaluated.

Decision block 212 is provided recognizing that the primary computer system continues to operate after the static snapshot of the selected data sets is taken in the backup mass storage. Accordingly, the primary computer system may have written current data blocks into the primary mass storage after the time of the static snapshot. If the static snapshot is simply copied into the primary mass storage device, then these current data block may be overwritten resulting in older data blocks replacing newer data blocks. Thus, the backup mass storage would no longer be current with the primary mass storage. However, decision block 212 avoids replacing the newer data blocks with the older data blocks. Thus, the backup mass storage and the primary mass storage remain mirrored after the restoration at least so far as the selected data set is concerned.

Figure 2:
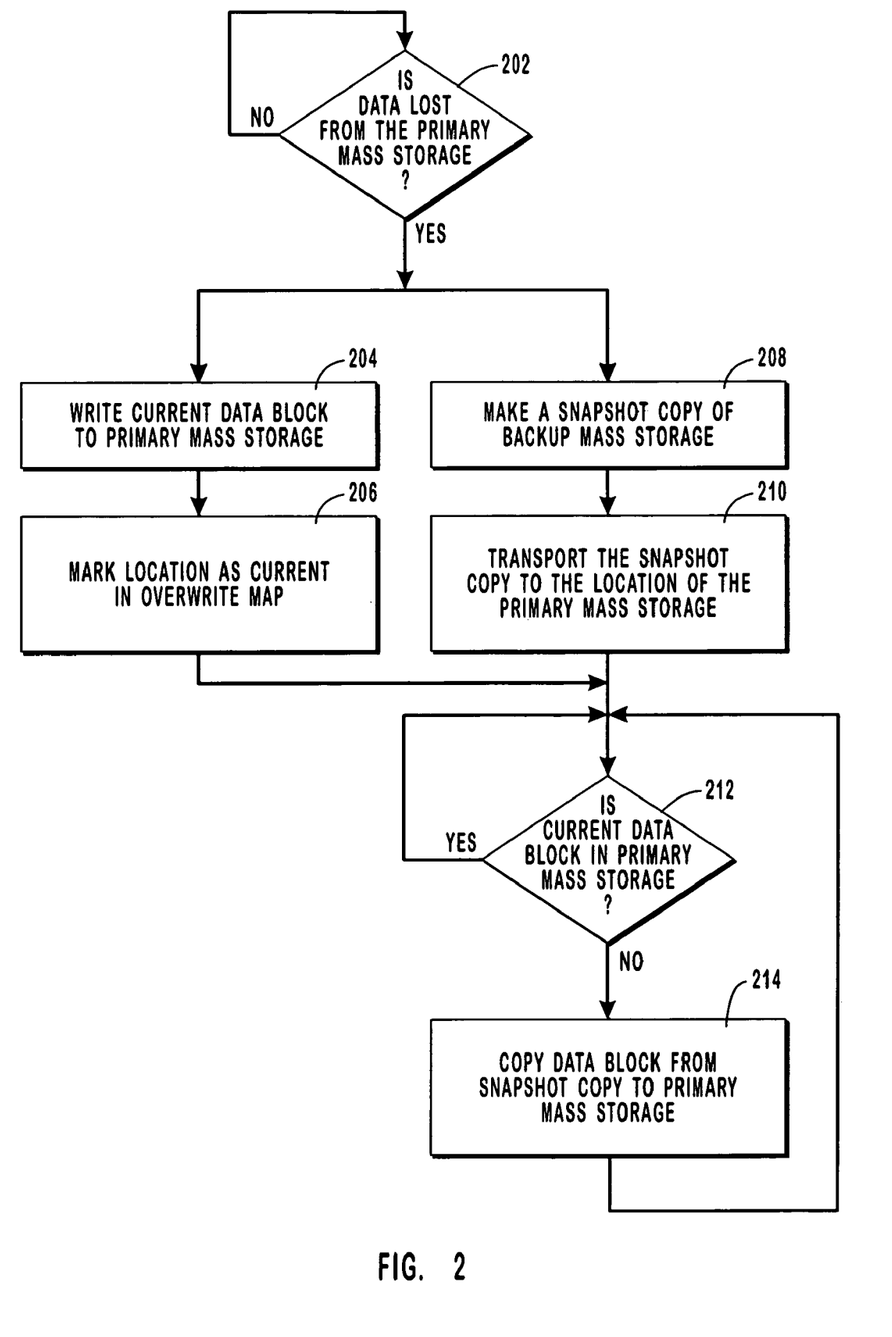
FIG. 2 is a flow diagram illustrating restorative steps that may be taken when data is lost and the primary mass storage device is available for data storage.
Figure 3A:
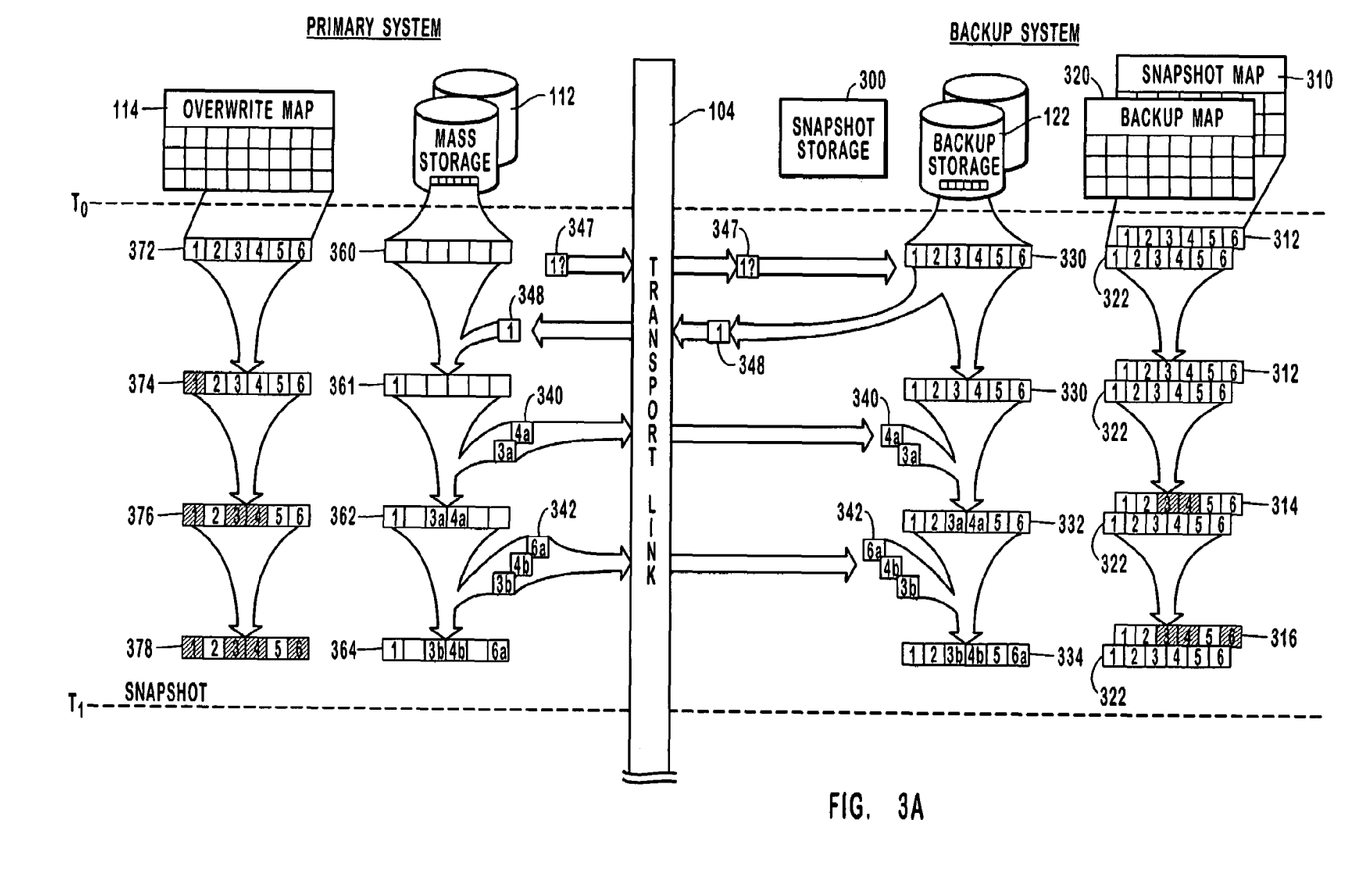
FIGS. 3A and 3B are diagrams illustrating an example of a method of the present invention.
Figure 3B:
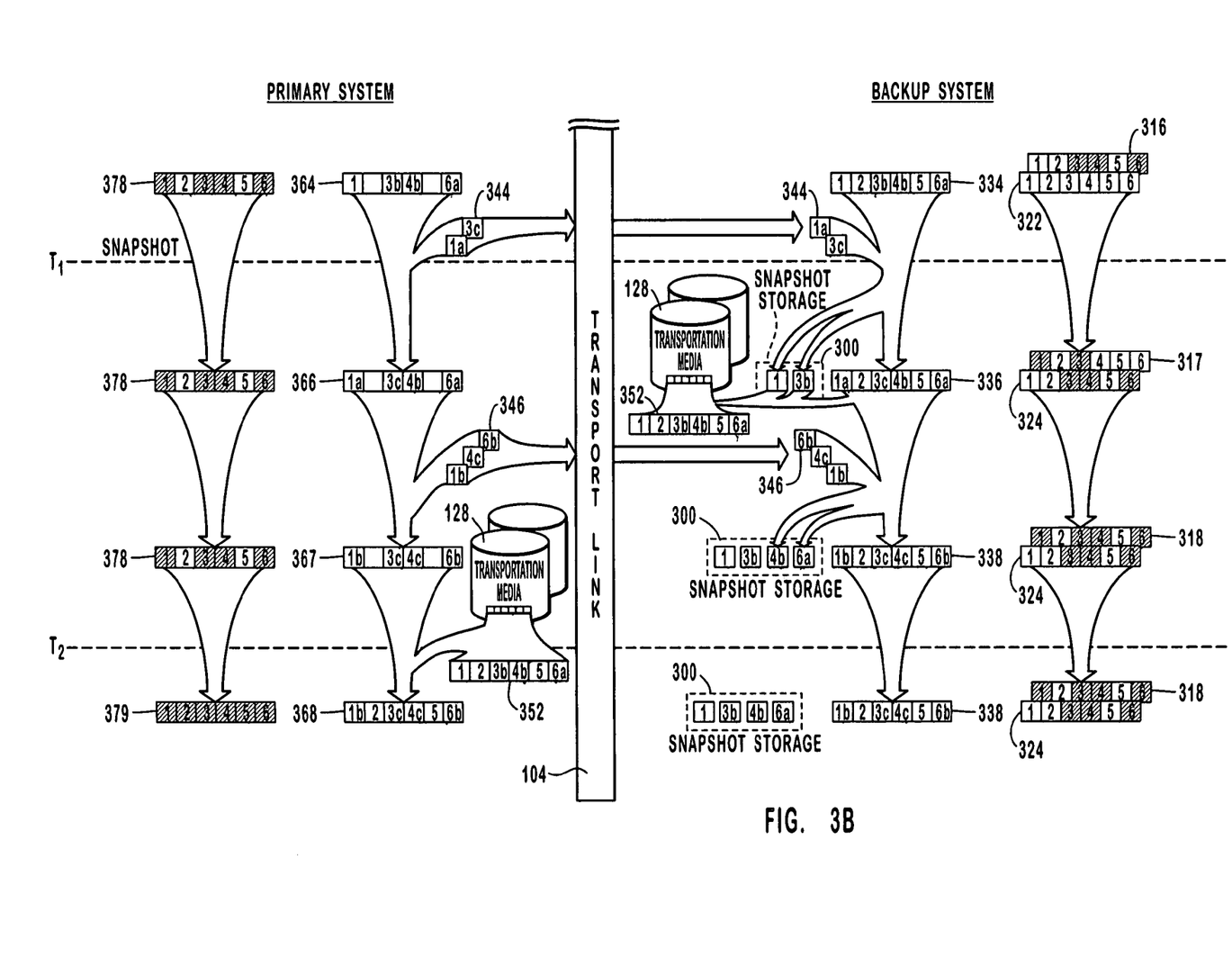

The method and process for restoring the lost data to the primary mass storage 112, as demonstrated through steps 202, 204, 206, 208, 210, 212 and 214 of FIG. 2, are more specifically depicted in FIGS. 3A and 3B.

Referring first to FIG. 3A, consider a group of data blocks 330, stored in storage locations numbered 1-6, of backup mass storage 122. FIG. 3A also shows that primary mass storage 112 has a similar group of six storage locations, 360, but they are not numbered so as to represent the fact that the data blocks have been lost from primary mass storage 112. Since the data blocks 1-6 are lost from the primary mass storage ("YES" in decision block 202), the method proceeds to perform two channels of restoration.

Note that the backup system includes a snapshot map 310 and a backup map 320 which assist in making a static snapshot (step 208) as described further below. Backup map 320 has six map locations 322 that correspond to storage locations 330 and snapshot map 310 has six map locations 312 that also correspond to storage locations 330. At time $T_0$ map location 322 and 312 are cleared. The primary system includes overwrite map 114 with map locations 372. Overwrite map 370 is used to track which of data blocks 360 in the primary mass storage 112 contain current data. At time $T_0$ map locations 372 are cleared to indicate that data blocks 360 have been lost and do not contain current data.

After time $T_0$, the primary system requests the data block stored at location 1 of data blocks 360. Because location 1 of data blocks 360 has been lost, the primary system sends read request 347 to the backup system, asking for the missing data block. As shown in FIG. 3A, the primary system and backup system communicate through transport link 104. The backup system responds by generating the data block 348, corresponding to storage location 1 of data blocks 360 at the primary system, and sending data block 348 to the primary system. As step 204 of FIG. 2 indicates, data read from the backup system is copied to the primary mass storage 112 resulting in data block 348 being written to data blocks 360 to produce data blocks 361. The overwrite map 114 is then altered to indicate which of data blocks 360 contain current data (step 206). Graying location 1 of map locations 374 denotes that location 1 of data blocks 361 contains current data.

Next, data blocks 340 are to be stored in storage locations 361 of mass storage 112. Thus, the current data blocks 340 are written into the primary mass storage 112. To ensure synchronization with the backup system after restoration, the current data blocks 340 are also written to the backup mass storage 122. Data blocks 340 represent two write requests and, like read request 347, are merely representative of the type of activity that may be generated by the primary computer system 110 as it continues operating despite the fact that data is lost on the primary mass storage 112. The requested writing of data blocks 340 into mass storage 112 is illustrated by locations 362 and the writing of data blocks 340 into backup storage 122 is illustrated by locations 332.

The storage locations where data blocks 340 have been stored are indicated as having been modified. At the primary system, map locations 376 of overwrite map 114 are grayed to indicate that locations 1, 3, and 4 have been modified and contain current data. At the backup system, a snapshot map can be used for this purpose. Map locations 314 of snapshot map 310 have been grayed to indicate that data blocks have been stored in storage locations 3 and 4. Note that the storage locations in backup map 320 remain unchanged, as indicated by map locations 322.

Suppose that the next request contained three data blocks 342 that were to be stored in locations 3, 4, and 6. Since a snapshot has not yet been taken, this request is handled in the same way as the previous write request with data blocks 342 being written to both backup storage 122 and mass storage 112. After the new data is stored in backup storage 122, storage locations 334 indicate that the data block stored in location 3 has been changed to 3*b*, the data block stored in location 4 has been changed to 4*b*, and the data block stored in location 6 has been changed to 6*a*. Likewise, after the new data is stored in primary mass storage 112, storage locations 364 indicate that the data block 3*a* has been changed to 3*b*, the data block 4*a* has been changed to 4*b*, and the data block 6*a* has been stored. As with the previous write request, the primary system updates map locations 378 to indicate that in addition to locations 1, 3 and 4, that location 6 of data blocks 364 contains current data. In addition, the backup system updates map locations 316 to indicate that in addition to locations 3 and 4, location 6 of data blocks 334 has been changed. Map locations 322 remain unchanged.

At this point in our example, $T_1$ represents a logically consistent state and a snapshot is taken of backup storage 122. Step 208 of FIG. 2 results in the snapshot being taken. Turning now to FIG. 3B, map locations 316 of snapshot map 310 are copied into map locations 324 of backup map 320. Thus, map locations 324 indicate that locations 3, 4, and 6 have had new data stored therein.

A write request is sent requesting that data blocks 344 be stored in storage locations 364 and storage locations 334. Execution proceeds in a similar manner as previous write requests in that data blocks 344 are stored in primary mass storage 112 and backup storage 122 as shown in storage locations 366 and storage locations 336. However, unlike previous write requests, a snapshot has now been taken at time $T_1$. Thus, the data blocks that were in storage locations 334 and then replaced by data blocks 344, as shown in storage locations 336, are stored in snapshot storage 300. Map locations 317 of snapshot map 310 indicate that storage locations 1 and 3 have been changed since the time of the snapshot taken at $T_1$ and that the corresponding data blocks are stored in snapshot storage 300. No changes are made to overwrite map 370 since map locations 378 already indicate that locations 1 and 3 of data blocks 366 contain current data.

As represented by step 208 of FIG. 2, a snapshot copy of a selected data set of the backup storage 122 is created. In this case, the selected data set is locations 1-6 of the backup storage 122. This is done by copying the data blocks into the transportation media 128 as the data blocks existed at the instant of the snapshot taken at $T_1$. Data blocks 334 represent the data stored in backup storage 122 when the snapshot was taken. However, because data blocks 344 subsequently have been written to backup storage 122, data blocks 336 represent the current state of backup storage 122. The desire to reconstruct backup storage 122 at time $T_1$ is one reason for snapshot map 310 and snapshot storage 300.

Consulting map locations 317 of snapshot map 310 reveals that locations 1 and 3 of data blocks 336 have had new data stored in them since time $T_1$ and that snapshot storage 300 must be accessed to retrieve the data blocks stored in backup storage 122 at time $T_1$. Notice that if locations 1 and 3 of data blocks 336 were replace with the corresponding data blocks in snapshot storage 300, the result would be data blocks 334, the state of backup storage 122 at time $T_1$.

Map locations 324 of backup map 320 indicate the data blocks that have changed between time $T_0$ and time $T_1$. Comparing data blocks 334 to data blocks 330 verifies that locations 3, 4, and 6 have changed, as shown by map locations 324. Map locations 324 are useful for generating the data blocks that have changed during a specific time period to keep two mass storage devices synchronized. For example, if backup storage 122 and another storage device had been synchronized at time $T_0$, then resynchronizing the devices at time $T_1$ would require transferring the data blocks indicated in map locations 324 of backup map 320. For more details regarding the operation of backup map 320 and snapshot map 310, refer to U.S. Pat. No. 5,649,152, which was previously incorporated herein by reference. In contrast, where an entire snapshot copy of backup storage 122 is to be created, there is no need to consult map locations 324 because all data blocks of backup storage 122 must be included, those that changed between time $T_0$ and time $T_1$, as well as those that did not.

Transportation media 128 is used to store the snapshot copy of the selected data set of backup storage 122. Note that data blocks 336, snapshot map locations 317, and snapshot storage 300 are used in creating the snapshot copy. As previously described, each data block of backup storage 122 appears in the snapshot copy. Using data blocks 336 to illustrate how the snapshot copy is created, map locations 317 are consulted to see if any data blocks have changed since time $T_1$. Grayed locations 1 and 3 of map locations 317 indicate that locations 1 and 3 of data blocks 336 were altered after time $T_1$. Because locations 1 and 3 of data blocks 336 have been changed, the corresponding data blocks are retrieved from snapshot storage 300. Locations 2, 4, 5, and 6 are stored on the backup storage as they were at time $T_1$ and therefore are provided from data blocks 336 of backup storage 122.

Comparing data blocks 352 of the snapshot copy storage on the transportation media with data blocks 334 of backup storage 122 verifies that the snapshot copy reflects backup storage 122 as it existed at time $T_1$. Next, data blocks 346 are written to both primary mass storage 112 and backup storage 122. At the primary system, data blocks 367 are the result of storing data blocks 346. No changes to overwrite map 370 are required since map locations 378 already indicate that locations 1, 4, and 6 at mass storage 112 contain current data.

Storing data blocks 346 at the backup system results in data blocks 336 becoming data blocks 338. In storing data blocks 346, map locations 317 are consulted to see if any of the data blocks, as they existed at time $T_1$, have been stored in snapshot memory 300. For example, location 1 of map locations 317 indicates that the corresponding data block (for time $T_1$) has been preserved in snapshot memory 300. Therefore, 1*b* can be stored at backup storage 122 without preserving data block 1*a* of data blocks 336 in snapshot storage 300. In contrast, locations 4 and 6 of map locations 317 indicate that the corresponding data blocks have not been preserved in snapshot storage 300. Thus, prior to writing 4*c* and 6*b* to data blocks 336, 4*b* and 6*a* (the data blocks in locations 4 and 6 when the snapshot was taken at time $T_1$) are stored in preservation memory 300. Map locations 317 are updated as illustrated in map locations 318 to show that the data blocks in locations 4 and 6 have been preserved in preservation memory 300. Then, blocks 4*c* and 6*b* are written to data blocks 336 to produce data blocks 338.

Execution then continues to step 210 of FIG. 2, to transport the snapshot copy to the location of the primary mass storage device. The transport of the data stored on mass storage 350 can take place in a variety of ways. By way of example, the data can be transported over cable, through telephone wire, across a network, or through fiber optics. In one embodiment, the static snapshot copy is stored on a transportation media 128 which is physically moved from the location of backup system 120 to the location of primary system. 110. The time that it would take to transport the snapshot copy varies depending on the transport means employed and the distance of the transport. As mentioned previously, the distance between primary system 110 and backup system 120 varies from being within close proximity to being in geographically separate locations.

In any event, decision block 212 and step 246 of FIG. 2 represent the manner in which the missing data blocks are restored to primary mass storage 112. Referring back to FIGS. 3A and 3B, $T_2$ represents the time in which the snapshot copy has been transported to the location of primary system 110. As depicted in FIG. 3B, the data blocks stored on the transportation media 128 that have not been updated since time $T_0$ can be copied to mass storage 112 to restore all necessary data blocks as they currently exist on the backup mass storage 122. More specifically, since primary mass storage 112 has data blocks 1*b*, 3*c*, 4*c* and 6*b* stored therein, as depicted in storage locations 367, the blocks necessary for full restoration are data blocks 2 and 5 from the snapshot copy stored on the transportation media 128.

The data blocks necessary for full restoration can be identified in a number of ways. For example, overwrite map 114 indicates the data blocks that are already current at the primary mass storage 112 at time $T_2$. Before writing data blocks 352 of mass storage 350 to data blocks 367 of mass storage 112, map locations 378 are consulted to insure that current data is not overwritten by older data. Map locations 378 indicate that locations 1, 3, 4, and 6 of data blocks 367 contain current data and that locations 2 and 5 remain lost. Therefore, only locations 2 and 5 of data blocks 352 are written to data blocks 367, as shown by data blocks 368. As locations from data blocks 352 are written to mass storage 112, the corresponding locations of overwrite map 370 are updated to indicate that mass storage 112 contains current data. Comparing data blocks 368 of mass storage 112 at the primary system to data blocks 338 of backup storage 122 confirms that a full restoration has taken place.

It should be appreciated that the foregoing discussion describes methods and systems for efficiently restoring lost data blocks to a primary computer system while still allowing the primary computer system to access the lost data blocks even before the restoration is complete. Therefore, the operation of the primary computer system continues despite having lost data. Furthermore, upon completion of restoration, the primary mass storage and the backup mass storage are synchronized.

It should also be appreciated that the methods and systems of the invention allow re-establishment of mirrored redundancy in an efficient and short time interval by first capturing all data at a give point in time from a backup storage, and then transporting that copy of data to a primary mass storage, while tracking updates taking place during the continuous operation after that point in time. Eventually the updates are merged with the transported data, thereby resulting in an accurate mirror relationship between the backup storage and the primary mass storage. It should be appreciated that this technique is usable both for restoring a primary server to operation as well as for setting up initial backup server operation. Thus, the principles described herein can be applied for initially synchronizing data from the primary server to a backup server.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system including a primary computer system having a primary mass storage device where data blocks are stored and a backup computer system having a backup mass storage device where a backup copy of the data blocks is stored, a method for restoring data blocks that are lost at the primary mass storage device, the method comprising the acts of:

after losing the data blocks at the primary mass storage device, receiving a first read request that would otherwise be processed by the primary computer system;

transmitting the first read request to the backup computer system;

as the backup computer system returns one or more data blocks from the backup mass storage device in response to the read request, writing the one or more data blocks to a mass storage device associated with the primary computer system;

prior to a full copy of the data blocks of the backup mass storage device being restored to the mass storage device associated with the primary computer system, performing the acts of:

receiving a second request, wherein the second read request is for at least one of the one or more data blocks that have been written to the mass storage device associated with the primary computer system; and responding to the second read request using the mass storage device associated with the primary computer system.

2. A method as recited in claim 1, further comprising the act of restoring the full copy of the data blocks to the mass storage device associated with the primary computer system by transmitting at least some of the data blocks from the backup computer system to the primary computer system using a communication link other than a link that was used to transmit the first read request to the backup computer system.

3. A method as recited in claim 2, wherein the act of transmitting at least some of the data blocks is conducted such that the one or more data blocks previously written to the mass storage device associated with the primary computer system are not included in the at least some of the data blocks.

4. A method as recited in claim 2, wherein the communication link used to transmit said at least some of the data blocks is faster than the link that was used to transmit the first read request to the backup computer system and has been brought on-line temporarily to restore the full copy of the data blocks.

5. A method as recited in claim 4, wherein the mass storage device associated with the primary computer system is a new mass storage device installed to replace the primary mass storage device.

6. A method as recited in claim 1, wherein the mass storage device associated with the primary computer system is different from the primary mass storage device.

7. A method as recited in claim 1, wherein the mass storage device associated with the primary computer system is the primary mass storage device.

8. A method as recited in claim 1, further comprising, prior to the full copy of the data blocks of the backup mass storage device being restored to the mass storage device associated with the primary computer system, further performing the acts of:
   receiving a write request;
   executing the write request on the mass storage device associated with the primary computer system; and
   transmitting the write request to the backup computer system such that the write request can be executed on the backup mass storage device.

9. A computer system having the capability of restoring data blocks that have been lost from a primary computer included in the computing system, the computer system comprising:
   a primary computer having a primary mass storage device where data blocks are stored;
   a backup computer having a backup mass storage device where a backup copy of the data blocks is stored prior to the primary mass storage device losing one or more data blocks; and
   a transport link for communicating between the primary computer and the backup computer, such that when the primary mass storage device loses one or more data blocks, the primary computer and the backup computer communicate over the transport link to perform the acts of:
      directing read requests of the one or more lost data blocks to the backup mass storage device;
      writing at least one data block read from the backup mass storage device to the primary mass storage device;
      taking a first snapshot of the backup mass storage device for preserving the backup data blocks as the backup data blocks existed at a time after the one or more data blocks were lost;
      creating a first snapshot copy of the backup data blocks for transferring the backup data blocks to the primary computer;
      identifying any of the data blocks in the first snapshot copy that correspond to data blocks the primary computer has not written to the primary mass storage device subsequent to the primary mass storage device losing the one or more data blocks; and
      making the identified data blocks available to the primary computer.

10. A system as recited in claim 9, wherein making the identified data blocks available to the primary computer further comprises copying the identified data blocks from the first snapshot copy to the primary mass storage device.

11. A system as recited in claim 9, wherein, when the primary mass storage device loses the one or more data blocks, the primary computer and the backup computer communicate over the transport link to further perform the act of writing to at least one of the one or more lost primary data blocks such that the at least one written data block is stored both on the primary mass storage device and the backup storage device.

12. A method for restoring data blocks to a primary mass storage device while allowing user access to the data blocks being restored, the method comprising:
   generating read requests for data blocks that have been lost in a primary mass storage device;
   directing each read request for a first data block to a backup mass storage device, wherein the data block returned from the backup mass storage device is written to the primary mass storage device; and
   directing each read request for a second data block to the primary mass storage device if the second data block has already been written to the primary mass storage device in response to a previous read request.

13. A method as defined in claim 12, further comprising writing a particular data block to the primary mass storage device in response to a write request.

14. A method as defined in claim 13, further comprising maintaining an overwrite map indicating which data blocks in the primary mass storage device are current.

* * * * *